July 17, 1928.
Re. 17,037
E. C. BALLMAN ET AL
PROJECTING APPARATUS
Original Filed Aug. 6, 1914
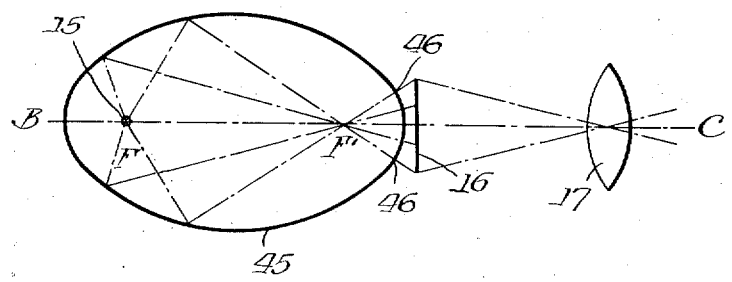
Witness:
Inventors
Edwin C. Ballman and
Edward P. Evers
by attorney
Pane Carpenter Reissued July 17, 1928. Re. 17,037

UNITED STATES PATENT OFFICE.

EDWIN C. BALLMAN, OF ST. LOUIS, AND EDWARD P. EVERS, OF OVERLAND, MISSOURI, ASSIGNORS, BY MESNE ASSIGNMENTS, TO ACME MOTION PICTURE PROJECTOR COMPANY, OF CHICAGO, ILLINOIS, A CORPORATION OF ILLINOIS.

PROJECTING APPARATUS.

Original No. 1,275,120, dated August 6, 1918, Serial No. 855,420, filed August 6, 1914. Application for reissue filed July 16, 1927. Serial No. 206,364.

This invention relates to projecting apparatus.

The ordinary optical lantern used in stereopticon or moving picture machines comprises a source of light, a condenser adapted to concentrate the light on the slide or film, and a projecting lens adapted to project an image of the object on the slide or film on a screen. The source of light is necessarily positioned some distance from the condenser, and the condenser, therefore, receives only the light represented by the solid angle having the source of light as the apex, and as a result, therefore, in the ordinary projecting apparatus only about 3½ per cent of the total light of the source is collected and projected on the screen. In view of the fact that only a small percentage of the total light can be utilized, the intensity of this source must be very great, and it is, therefore, necessary to utilize a high candle power source, such as an arc. The arc must, however, be placed a considerable distance from the condenser to avoid breakage, thereby causing the solid angle to be small; in addition, the high temperature arc is a source of danger, especially in moving picture machines, where an inflammable film is used. Apart from the low effective efficiency of this apparatus and the danger involved in its operation, the arc is necessarily an unsteady source of light, which requires constant regulation, which regulation can only be accomplished by hand and, therefore, requires for its operation, exceptionally skilled operators, and even then the image will be unsteady.

Some of the objects of this invention therefore are, to provide a projecting apparatus which will obviate the disadvantages of the present construction, which is characterized by high efficiency, constancy of operation, which requires practically no attention, and in which the danger from fire is entirely eliminated.

More specifically stated, the objects of this invention are, to provide a projecting apparatus in which the source of light is an electric light bulb having a portion thereof formed with an ellipsodial reflector, which is constructed and arranged with respect to the source of light and the object to be projected to concentrate the major part of the light from said source on the object in such a manner that the object will be illuminated uniformly.

Further objects will appear from the detail description taken in connection with the accompanying drawing.

The figure is a diagram of a projecting apparatus constructed in accordance with this invention.

Referring now, to the figure, B—C represents the axis of the apparatus, 15 the source of light, 16 the object (slide or film), and 17 the projecting lens. A reflector 45 comprising an ellipsoid, formed by revolving an ellipse about B—C as the axis of revolution, is so arranged that one of its foci F is positioned at the source of light 15, while its other focus F′ is positioned adjacent the object 16. Now, in an ellipsoid, a ray originating at one focus and incident on the ellipsoidal surface will be reflected back to the other focus. It, therefore, follows that, when a source of light is positioned at one focus of an ellipsoidal reflector, the total light will be reflected back and come to a focus at the other focus. If, therefore, we utilize an ellipsoidal reflector, placed as shown in the figure and with the reflecting surface extending behind said source and also beyond the source, the major part of the light from said source will be concentrated at the other focus. The proportion of the total light emitted, concentrated at the other focus, increases as the reflecting surface is extended beyond or in front of the source of light, but it will be noted that the major part of the emitted light is thus concentrated when one-half or even one-fourth of a complete eclipse is used.

If the object 16 is placed in the concentrated beam of light, either to the left or to the right of the focus F′, this object will receive the major part of the light emitted by the source. As a matter of fact, taking both the reflected and the direct illumination, the object will receive practically all of the light from the source. The image of the object so illuminated is projected by the projecting lens 17 on the screen.

With this construction, therefore, practically all of the light emitted from the source will be concentrated on the object so that there is no loss, and the efficiency will, therefore, be exceedingly high. It will, therefore, be obvious that, with this construction, the intensity of the source can be very much less than the intensity with the prior construction, which utilized only a small proportion of the light emitted. With this construction, therefore, a source of light having a candle power of 100 will result in an image having the same brightness as the image produced by the prior construction, when a source, such as an arc, having a candle power of 2000 is used.

The figure shows a construction in which the elliptical reflector 45 forms the bulb for the source of light. In this construction the foci are shown at F, F′, the source of light (filament) being positioned at one focus F, and the light from this source coming to a focus at F′ and being concentrated on the object, 16. The bulb, with the exception of the surface bounded by the line 46 representing the issuance of the conical beam of light concentrated on the object, is silvered to form a reflecting surface, but is left unsilvered where the conical beam of light issues. This construction is of advantage in small units, since the bulb there performs the double function of a bulb and a concentrator.

In the construction shown in the drawing, the reflector 45 is a simple ellipsoid. This bulb may, however, be a compound ellipsoid of the form shown and described in Figures 5 to 12 inclusive of our companion reissue application, S. N. 401,276, filed August 4, 1920. In the first cases, the filament will be closely coiled, while in the latter cases this filament will be a ring.

It will, therefore, be seen that the invention accomplishes its object. An apparatus is produced in which the major part and substantially all of the light emitted by the source is concentrated on the object whose image is to be projected on the screen. The efficiency of the apparatus will, therefore, be very high, permitting the use of a low candle power source of light. Such a low candle power source not only lessens the danger from fire, but also protects the apparatus. Since this construction permits the use of an incandescent filament adapted to operate from a constant voltage system, the intensity of illumination may be kept constant without attention from the operator. This feature, in connection with the uniform distribution of the light on the object illuminated and to be projected, results in an image which is uniform and constant.

It is obvious that various changes may be made in details of construction without departing from the spirit of this invention, and it is, therefore, to be understood that this invention is not to be limited to the specific construction shown and described.

Having thus described the invention, what is claimed is:

1. A projecting apparatus comprising an electric light bulb having a portion thereof formed as an ellipsoid reflector with the filament at one focus.

2. A projecting apparatus comprising an electric light bulb having a portion thereof formed as a reflector comprising a surface of revolution constructed and arranged to concentrate light from the filament on an object.

3. A projecting apparatus comprising an electric light bulb, ellipsoidal in shape, with the filament at one focus, the bulb being constructed and arranged to concentrate upon an object adjacent the other focus, substantially all of the rays from the filament except such as impinge upon the object directly from the filament.

4. A projecting apparatus comprising an electric light bulb having a portion thereof formed as an ellipsoid reflector with the filament at one focus, said reflector being constructed and arranged to concentrate the light uniformly on an object at the other focus.

5. A projecting apparatus comprising an electric light bulb having a portion thereof formed as a reflector comprising a surface of revolution constructed and arranged to concentrate light from the filament uniformly on an object.

6. A projecting apparatus comprising an electric light bulb ellipsoidal in shape with the filament at one focus, the bulb being constructed and arranged to concentrate uniformly upon an object adjacent the other focus substantially all of the rays from the filament except such as impinge upon the object directly from the filament.

In testimony whereof we affix our signatures.

EDWIN C. BALLMAN.
EDWARD P. EVERS.